United States Patent
Daniels, Jr.

[15] 3,680,744
[45] Aug. 1, 1972

[54] MEASURING DISPENSER

[72] Inventor: Francis James Daniels, Jr., 7332 S.W. 80th St. Plaza, Apt. 184, Miami, Fla. 33143

[22] Filed: Aug. 19, 1970

[21] Appl. No.: 65,105

[52] U.S. Cl. .................. 222/437, 222/438, 222/454
[51] Int. Cl. ............................................. G01f 11/28
[58] Field of Search ...... 222/437, 438, 454, 455, 456, 222/457

[56] References Cited

UNITED STATES PATENTS

| | | | |
|---|---|---|---|
| 1,495,683 | 5/1924 | Gates | 222/457 X |
| 1,540,122 | 6/1925 | Harder | 222/456 |
| 1,665,139 | 4/1928 | Lundholm | 222/437 |
| 2,579,083 | 12/1951 | Kramer | 222/437 |
| 3,258,174 | 6/1966 | Mullen | 222/456 X |

Primary Examiner—Robert B. Reeves
Assistant Examiner—Frederick R. Handren
Attorney—Polachek, Saulsbury & Hough

[57] ABSTRACT

A measuring device adapted to be placed in the opening of a container in which there are provided spaced wall members joined together and adapted to fit snugly within the container opening, the openings of the respective spaced wall members being diametrically-disposed. The container having divided dry material is first tilted in one direction from an upside-down position and then tilted in the opposite direction to dispense the contents. Provision is made for enlarging the opening of the inner wall member by removing portions from scorings thereof.

5 Claims, 7 Drawing Figures

PATENTED AUG 1 1972                      3,680,744
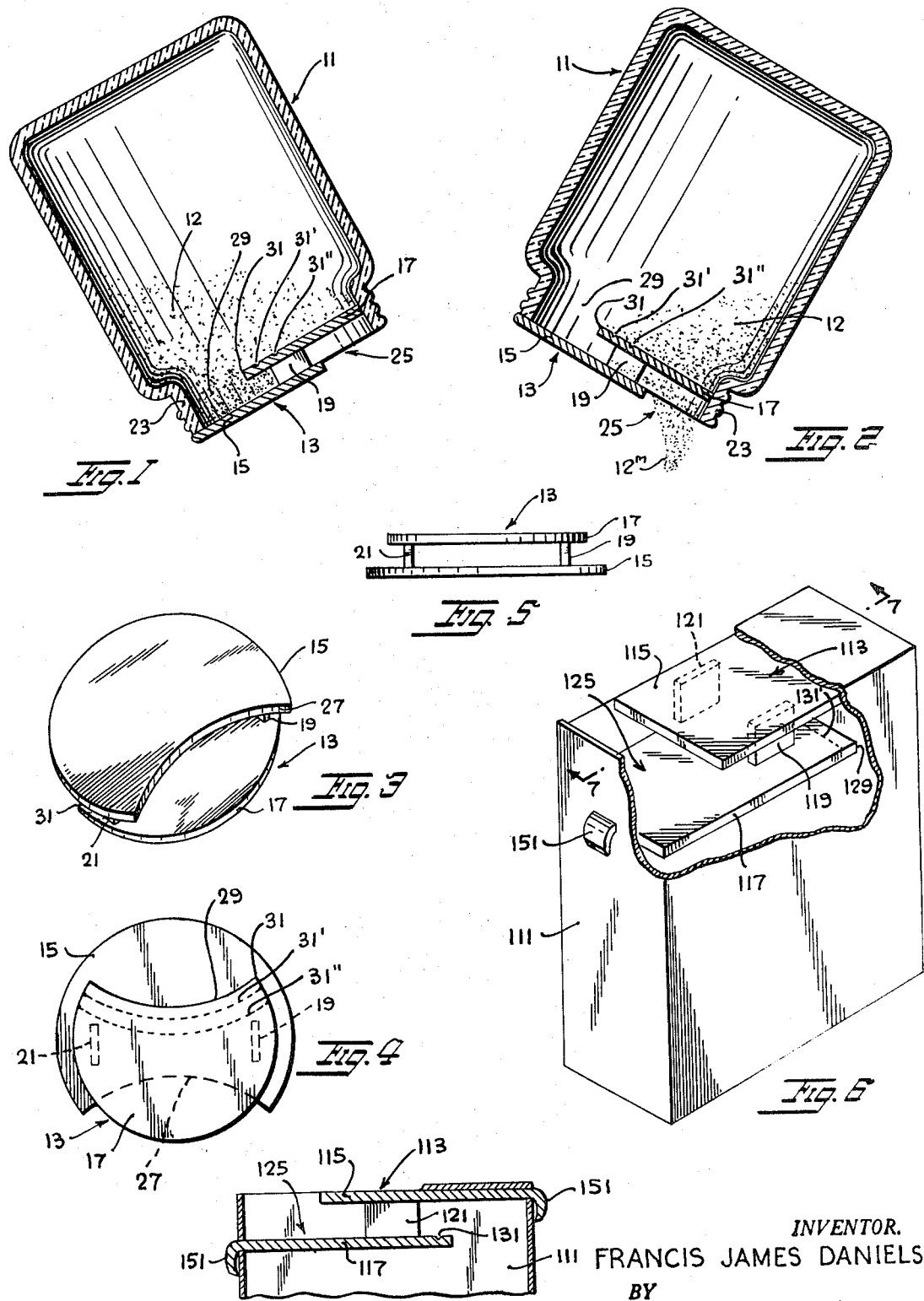
INVENTOR.
FRANCIS JAMES DANIELS, JR
BY
Polachek & Saulsbury
ATTORNEY

MEASURING DISPENSER

This invention relates to dispensing devices and more particularly to devices for dispensing a measured quantity of a powdered or otherwise divided material.

The present invention finds ready use with food containers from which a powdered foodstuff such as tea, coffee, spices, etc., or an otherwise divided foodstuff such as dried cereal must be poured in predetermined measured quantities.

Most containers of divided material make no provision for automatically dispensing the desired measured quantity of the material therein. The user is required to first locate a measuring device, pour from the container into the measuring device and then from the measuring device into either a mixing bowl or dish of food. It is difficult to obtain an accurate measure using such a system since the material being dispensed quite often overflows the measuring device or since the measuring devices, which are manufactured for predetermined quantities (teaspoons and tablespoons), are not always sized to measure the ideal quantity for the particular material to be dispensed.

It is an object of this invention to provide a novel dispensing device.

Another object is to provide a novel device for dispensing a measured quantity of a divided material.

Another object is to provide a novel dispensing device for dispensing a measured quantity of a divided material wherein the device may be easily and readily conditioned for dispensing one of a plurality of different selectable quantities.

Still another object is to provide a novel dispensing device for dispensing a measured quantity of a divided material from a container containing such material wherein said device is adapted for removable placement in proximity to the opening provided in said container.

The present invention contemplates a dispenser having upper and lower spaced walls with an aperture formed in each wall, the aperture in one of said walls being formed in a position which is diametrically-disposed with respect to the aperture in the other of said wall. The size of one of said apertures and the space between the upper and lower walls determining the measuring capacity of said dispenser.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a sectional view of a jar and dispenser therefor which embodies the present invention showing the jar tilted into position to measure a quantity of its contents.

FIG. 2 is a similar view of the jar and dispenser of FIG. 1 in position to discharge the measured quantity.

FIG. 3 is a top perspective view of the dispenser removed from the jar of FIG. 1.

FIG. 4 is a bottom plan view of the dispenser.

FIG. 5 is a front elevational view of the dispenser shown in FIG. 4.

FIG. 6 is a perspective view of a boxlike container showing a modified version of the dispenser.

FIG. 7 is a fragmentary sectional view taken on the line 7—7 of FIG. 6.

Referring to the drawing for a more detailed description of the present invention, an embodiment thereof is shown in position in a jar generally designated by the numeral 11, in which there is stored a quantity of a powdered material 12 such as instant coffee or tea. It should be understood, however, that the hereinafter described application of the invention to a jar of instant coffee or tea is for purpose of illustration only inasmuch as the subject invention finds ready application in containers of any shape, such as square, oblong, etc., and from which any dry material, such as cereal, flour, soup, etc., is to be dispensed.

The dispenser is designated by the numeral 13 and has an upper wall 15 and a lower wall 17 secured together in spaced relationship by two upright walls 19 and 21. Both walls 15 and 17 are of circular configuration with upper wall 15 having a diameter substantially equal to the outside diameter of the neck portion 23 of the jar 11 and lower wall 17 having a diameter substantially equal to the inner diameter of neck portion 23 of jar 11.

A dispensing opening 15 is formed in upper wall 15 by removing a portion thereof along a line 27. If dispenser 13 is inserted into jar 11 prior to sale thereof, upper wall 15 may also be utilized in place of the seal (not shown) normally found closing neck 23 of jar 11. As such, line 27 may be scribed upon upper wall 15 with instructions for the user to sever therealong in order to provide jar 11 with a dispensing opening such as 25.

A measuring opening 29 is formed in lower wall 17 by removing a portion thereof along a line 31. The size of opening 29 may be varied by removing portions of lower wall 17 along other lines such as 31' or 31" which lines 31', 31" may be scribed upon lower wall 17 during manufacture thereof as clearly shown in FIG. 2. The spacing between upper wall 15 and lower wall 17, as determined by the height of upright walls 19 and 21, and the amount of material removed from lower wall 17, to form opening 29 therein, determines the measured quantity of coffee or tea to be dispensed with each operation of jar 11 and dispenser 13.

In operation, with dispenser 13 in place as shown in FIGS. 1 and 2, jar 11 is turned upside down and tilted to its measuring position (FIG. 1) wherein opening 29 is disposed at a low point. Jar 11 is then pivoted to its dispensing position (FIG. 2) wherein opening 25 moves to a low point. During movement of jar 11 from the measuring position (FIG. 1) to the dispensing position (FIG. 2) the material 12 (FIG 2) which has been measured, flows out of the dispensing opening 25. All excess material moves onto lower wall 17 (FIG. 2) and is prevented thereby from flowing out of jar 11.

The dispenser may be constructed from cardboard, plastic, thin metal or other suitable materials. The more durable materials are recommended when the dispenser is to be placed into successive containers as each previous container is emptied. When the dispenser is to be relocated into successive containers the lower member should be constructed to a slightly larger diameter than the inside diameter of the neck of the container to provide a snug fit and prevent the dispenser from falling out of the container during use thereof.

FIG. 6 shows a modified form of dispenser adapted for use with a box-shaped container 111. In this embodiment the dispenser is designated by the numeral 113 and has an upper wall 115 and a lower wall 117 secured together in spaced relationship by two upright walls 119 and 121. Both walls 115 and 117 are of rectangular configuration with a dispensing opening 125 formed in upper wall 115 and a measuring opening 129 formed in lower wall 117. Score lines such as 131' may be provided on lower wall 117 to vary the size of measuring opening 129.

When container 111 is constructed with dispenser 113 in place, upper wall 115 may also serve as the top of container 111. The material which is otherwise removed from upper wall 115 to form opening 125 may merely be folded back and when container 111 is not in use said material placed in a position blocking opening 125 to form a closure therefor.

When dispenser 113 is purchased as an item separate and distinct from container 111, tabs such as 151 are provided on the ends of upper wall 115 and lower wall 117 which are to be disposed adjacent the walls of container 111. Insertion of tabs 151 through the walls of container 111 firmly anchors dispenser 113 in place.

In operation, container 111 is tilted so that measuring opening 129 occupies a low point. The material to be dispensed fills the measuring space provided between upper wall 115 and lower wall 117. Tilting of container 111 to bring dispensing opening 125 to a low point allows the material to be dispensed to flow between upper wall 115 and lower wall 117 and out of dispensing opening 125. The remaining material is prevented by lower wall 117 from flowing out of container 111.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A measuring dispenser adapted to be placed in the opening of a container having a divided dry material therein comprising spaced parallel wall members of a configuration substantially conforming to the configuration of the opening of the container, and adapted to be snugly fit therein, diametrically-disposed openings in said spaced wall members, the dry material flowing successively into one of said diametrically-disposed openings and out of the other of said diametrically-disposed openings when dispensed from the container, the size of one opening and the size of said space between said spaced wall members measuring a predetermined amount of divided dry material to be dispensed from the container with each dispensing operation thereof; and score line means on the inner wall member to permit the breaking away of portions to vary the size of the wall opening and the amount of dry material to be dispensed.

2. A measuring dispenser adapted to be placed in the opening of a container having a divided dry material therein as defined in claim 1 and said opening in said container and said spaced wall members having substantially circular configuration, and said openings in said spaced wall members having a substantially elliptical configuration.

3. A measuring dispenser adapted to be placed in the opening of a container having a divided dry material therein as defined in claim 1 and said opening in said container, said spaced wall members and said diametrically-disposed openings having a rectangular configuration.

4. A measuring dispenser adapted to be placed in the opening of a container having a divided dry material therein as defined in claim 1 and said opening in said container and said first and second wall members having a substantially circular configuration, and said dispensing opening and said measuring opening having a substantially elliptical configuration.

5. A measuring dispenser adapted to be placed in the opening of a container having a divided dry material therein comprising spaced parallel wall members of a configuration substantially conforming to the configuration of the opening of the container, and adapted to be snugly fit therein, diametrically-disposed openings in said spaced wall members, the dry material flowing successively into one of said diametrically-disposed openings and out of the other of said diametrically-disposed openings when dispensed from the container, the size of said one opening and the size of said space between said spaced wall members measuring a predetermined amount of divided dry material to be dispensed from the container with each dispensing operation thereof; and tabs formed on the edge portions of said first and second wall members other than the edge portions having the openings formed therein, and said first and second wall members being of a size adapting same for a snug fit in the upper portion of a rectangular container, said tabs being passed through the walls of the container to secure said first and second wall members in position in the container.

* * * * *